(12) United States Patent
Rannow

(10) Patent No.: US 10,844,884 B2
(45) Date of Patent: Nov. 24, 2020

(54) LEAKAGE MODULATION IN HYDRAULIC SYSTEMS CONTAINING A THREE-WAY SPOOL VALVE

(71) Applicant: Eaton Intelligent Power Limited, Dublin (IE)

(72) Inventor: Michael Rannow, Eden Prairie, MN (US)

(73) Assignee: Eaton Intelligent Power Limited, Dublin (IE)

(*) Notice: Subject to any disclaimer, the term of this patent is extended or adjusted under 35 U.S.C. 154(b) by 5 days.

(21) Appl. No.: 16/218,610

(22) Filed: Dec. 13, 2018

(65) Prior Publication Data

US 2019/0186511 A1 Jun. 20, 2019

Related U.S. Application Data

(60) Provisional application No. 62/599,417, filed on Dec. 15, 2017.

(51) Int. Cl.
| | |
|---|---|
| *F16K 31/06* | (2006.01) |
| *F15B 20/00* | (2006.01) |
| *F15B 13/04* | (2006.01) |
| *F15B 13/08* | (2006.01) |
| *F16K 11/07* | (2006.01) |
| *G01M 3/28* | (2006.01) |
| *G05D 16/00* | (2006.01) |
| *F15B 13/043* | (2006.01) |
| *F15B 13/044* | (2006.01) |

(52) U.S. Cl.
CPC ........ *F15B 20/005* (2013.01); *F15B 13/0402* (2013.01); *F15B 13/086* (2013.01); *F15B 20/008* (2013.01); *F16K 11/07* (2013.01); *F16K 31/0675* (2013.01); *G01M 3/2876* (2013.01); *G05D 16/028* (2019.01); *F15B 13/0433* (2013.01); *F15B 13/0435* (2013.01); *F15B 13/0442* (2013.01); *F15B 13/0446* (2013.01); *F15B 2211/42* (2013.01); *F15B 2211/857* (2013.01); *Y10T 137/2544* (2015.04); *Y10T 137/8671* (2015.04); *Y10T 137/86622* (2015.04)

(58) Field of Classification Search
CPC ....... Y10T 137/2544; Y10T 137/86622; Y10T 137/8671
See application file for complete search history.

(56) References Cited

U.S. PATENT DOCUMENTS

| | | | | |
|---|---|---|---|---|
| 4,061,155 A | * | 12/1977 | Sopha | F15B 13/0436 137/85 |
| 4,456,434 A | * | 6/1984 | El Ibiary | F04B 1/324 137/625.65 |
| 5,806,565 A | * | 9/1998 | Kadlicko | F15B 13/0402 137/625.63 |
| 2015/0129072 A1 | * | 5/2015 | Hara | F16K 31/0613 137/625.65 |
| 2019/0186510 A1 | * | 6/2019 | Rannow | F15B 13/0402 |

* cited by examiner

*Primary Examiner* — Robert K Arundale
(74) *Attorney, Agent, or Firm* — Merchant & Gould P.C.

(57) ABSTRACT

Hydraulic systems and associated methods configured to reduce leakage past a spool valve when the system is in a neutral state. Leakage reduction is achieved by shifting the spool valve within the spool bore. The amount of shifting can be controlled by a pressure controller that sets one or pressures in the system and actively/dynamically adjusts the system to achieve a desired pressure or set of pressures by shifting the spool valve.

22 Claims, 3 Drawing Sheets

LEAKAGE MODULATION IN HYDRAULIC SYSTEMS CONTAINING A THREE-WAY SPOOL VALVE

CROSS-REFERENCE TO RELATED APPLICATION

This application claims priority to U.S. Provisional Patent Application 62/599,417 filed Dec. 15, 2017, the disclosure of which is incorporated herein by reference in its entirety.

BACKGROUND

In typical hydraulic systems containing a three-way spool valve, undesirable fluid leakage can occur from the fluid supply/pump into the work port, and also from the work port into the tank. Hydraulic systems designed to operate with relatively low service pressure can be more prone to leakage into the work port from supply when sitting idle with a relatively high supply pressure; and hydraulic systems designed to operate with relatively high service pressure can be more prone to leakage out of the work port into the tank when sitting idle.

Such leakage can, e.g., cause an actuator (e.g., a hydraulic cylinder that drives a load) of the system to undesirably drift over time, negatively impacting system performance. Introducing additional valves can reduce spool valve leakage but at significant increased cost to the system.

SUMMARY

In general terms, the present disclosure is directed to hydraulic systems and associated methods that modulate leakage past spools of three-way spool valves when the system sits idle, i.e., is in neutral. Depending on the pressures of the supply side and the load side, leakage can occur either out of the work port into the tank (e.g., in the case of relatively high/heavy load), and/or out of the fluid supply/pump into the work port (e.g., in the case of a relatively high supply pressure). The systems and methods of the present disclosure can help to modulate at least one or more of these types of leakage.

One aspect of the present disclosure relates to a hydraulic system, the hydraulic system having an operational state and a neutral state and comprising a fluid supply line having a supply port and in fluid communication with a work port, the work port being in fluid communication with a tank line having a tank port and being connected to a tank, the system further comprising a spool valve having a spool at least partially disposed in a spool bore defining an axis, the spool being axially moveable within the bore and being adapted to regulate fluid flow from the supply line/supply port to the work port and from the work port to the tank/tank line/tank port, the system further comprising a driver and a pressure controller adapted to receive one or more pressure inputs and provide one or more flow outputs based at least in part on the one or more pressure inputs, the one or more flow outputs causing the driver to axially shift the spool within the bore when the system is in the neutral state.

In some examples of the foregoing hydraulic systems, the one or more flow outputs cause the driver to axially shift the spool such that the work port is at least partially opened to the tank line/tank port.

In some examples of the foregoing hydraulic systems, the one or more flow outputs cause the driver to axially shift the spool such that the work port is at least partially opened to the supply line/supply port.

In some examples of the foregoing hydraulic systems, the one or more flow outputs cause the driver to axially shift the spool to increase an axial deadband distance of the spool associated with the supply line/supply port or to increase an axial deadband distance of the spool associated with the tank line/tank port without opening either of the supply port or the tank port to the work port.

As described herein, a first port is open, or in direct fluid communication with a second port, when at least a portion of the first port coincides with a flow passage defined between a pair of lands of the spool. The size of the opening of an open port depends on the exact position of the edge of a corresponding land adjacent the flow passage relative to the port. That is, the size of the opening of an open port depends on the length of the axial portion of the flow passage coinciding with the port. It should be appreciated that flow rate through an open port can be regulated based on the size of the opening. Thus, by controlling the exact position of the lands relative to their respective ports, the valves of the present disclosure can be used to generate metered flow through the ports.

In contrast to an open port, a land of the spool blocks its corresponding port when the edge of the land adjacent the flow passage coincides with a region of the spool bore between the corresponding port and the work port. Leakage, as that term is used herein, refers to fluid flow from a blocked port axially past the corresponding land of the spool that is blocking that port and into the flow passage. Thus, two ports can be in "fluid communication" with each other even if one or both of them are blocked by a land or lands of the spool, and fluid can travel from one port to the other by leaking past the spool. However, two ports can be in "direct fluid communication" only when neither port is blocked by a land of the spool.

In some examples of the foregoing hydraulic systems, the system includes one or more pressure sensors that detect one or more fluid pressures within the system and provide measurements of the one or more fluid pressures to the pressure controller.

In some examples of the foregoing hydraulic systems, the pressure controller is configured to command the driver to axially shift the spool within the bore when the system is in the neutral state before a pressure at the work port reaches a level high enough or low enough to cause drifting of an actuator/cylinder (or high enough/low enough to cause more than a predefined threshold drifting of the actuator/cylinder) connected to the work port. Thus, in some examples, the axial shifting of the spool within the bore is triggered before a pressure differential is large enough to cause drifting of the actuator/cylinder connected to the work port.

In some examples of the foregoing hydraulic systems, the pressure controller imposes a flow limit that limits a distance that the spool shifts axially to open, or to allow more leakage from, the supply port or the tank port to the work port. That is, the flow limit can in some cases set a maximum limit on the size of the supply port/tank port opening to the flow channel and in other cases set a minimum limit on the leakage distance associated with the supply port or tank port. In some examples, the flow limit is selected to minimize drifting of the cylinder/actuator connected to the work port that could occur from an external change to the system while it remains in neutral, such as a sudden increase or decrease in the size of an external load. It should be appreciated, therefore, that the flow limit can correlate to an axial shifting distance of the spool.

In some examples of the foregoing hydraulic systems, the axial shifting of the spool is determined by one or more algorithms or flow maps (e.g., a look-up table) that calculates an optimal position of the spool relative to the bore given the desired pressure at the work port and/or the flow limit. In some examples one or more algorithms or flow maps are configured to optimize leakage as between the supply line and the work port, and as between the work port and the tank/tank line, so as to minimize or reduce drift of an actuator of the system, e.g., a cylinder.

Thus, according to some examples, the present disclosure is directed to hydraulic systems and spool valves (and associated methods) configured, when the system/spool valve is in the neutral state, to optimize leakage as between the supply line and the work port, and as between the work port and the tank, so as to minimize drift of an actuator of the system, e.g., a cylinder.

By actively controlling the pressure at the work port and/or the supply port with the pressure controller, and allowing controlled direct flow or leakage from the work port to the tank port/tank line or from the supply line/supply port to the work port, even when the hydraulic system is in neutral, leakage that could cause undesirable cylinder drift is reduced.

Furthermore, active control of the pressure at the work port, including imposing a flow limit, allows the hydraulic system to adapt to changes that may take place while the system sits idle, such as a temporary increase or decrease of a load.

In some examples of the foregoing hydraulic systems, the driver comprises a solenoid. In some examples, the driver comprises one or more proportional solenoids adapted to apply force to the spool in proportion to a current supplied to the solenoid. In alternative examples, the driver comprises a voice coil, which controls a pilot spool, which provides the needed flow/pressure to move the main stage spool, the main stage spool being the spool shown and described in this disclosure. The current to the voice coil is proportional to the flow provided to move the main stage spool.

In at least some examples of the hydraulic systems and three-way spool valves of the present disclosure, the system/valve comprises one or more biasing mechanisms adapted to axially bias the spool towards a neutral position (or neutral axial position) relative to the bore when the system is in the neutral state. The neutral position of the spool can be a centered position to which the spool is biased when the system is in the neutral state or a position offset from center to which the spool is biased when the system is in the neutral state. In at least some examples, the centered position of the spool relative to the spool bore is the position in which the deadband distances of the supply side land and the tank side land are equal.

Whether a given spool is center-biased or offset-biased in its neutral position, the spool blocks direct fluid communication between the supply port and the work port and between the work port and the tank port when the spool is in the neutral position. A shifted neutral position (or shifted neutral axial position) of the spool is shifted relative to the neutral position of the spool.

As mentioned, in some examples of the foregoing hydraulic systems, the spool comprises first and second lands, each land having an associated deadband distance with an associated port, and wherein the axial shifting causes one of the deadband distances to increase and the other deadband distance to decrease. In some examples, the lands are shifted such that one of the lands unblocks its associated port allowing for direct fluid flow from the associated port to the flow passage between the lands.

Another aspect of the present disclosure relates to a method of modulating leakage in a hydraulic system, the hydraulic system having an operational state and a neutral state and comprising a fluid supply line having a supply port in fluid communication with a work port, the work port being in fluid communication with a tank line having a tank port and being connected to a tank, the hydraulic system further comprising a spool valve having a spool at least partially disposed in a spool bore defining an axis, the spool being axially moveable within the bore and being adapted to regulate fluid flow from the supply line/supply port to the work port and from the work port to the tank line/tank port; the method comprising measuring a pressure at the work port, controlling, with a pressure controller, a pressure at the work port at least in part by commanding a driver to axially shift the spool within the bore when the system is in the neutral state.

In some examples of the foregoing methods, the system includes one or more pressure sensors that detect one or more fluid pressures within the system and provide one or more measurements of the one or more fluid pressures, including the pressure measurement at the work port, to the pressure controller.

In some examples of the foregoing methods, the pressure controller is configured to command the driver to axially shift the spool within the bore before a pressure at the work port reaches a level high enough or low enough to cause drifting of an actuator/cylinder connected to the work port. Thus, in some examples, the axial shifting of the spool is triggered before a pressure differential is large enough to cause drifting of the cylinder (or large enough to cause more than a predefined threshold drifting of the cylinder) connected to the work port.

In some examples of the foregoing methods, the axial shifting of the spool causes one of the supply port or the tank port to at least partially open.

In some examples of the foregoing methods, the method further comprises imposing a flow limit that limits a distance that the spool shifts axially to open, or to allow more leakage from, the supply port or the tank port to the work port. That is, the flow limit can in some cases set a maximum limit on the size of the supply port/tank port opening to the flow channel and in other cases set a minimum limit on the leakage distance associated with the supply port or tank port. In some examples, the flow limit is selected to minimize drifting of the cylinder/actuator connected to the work port that could occur from an external change to the system while it remains in neutral, such as a sudden increase or decrease in the size of an external load. It should be appreciated, therefore, that the flow limit can correlate to an axial shifting distance of the spool.

In some examples of the foregoing methods, the axial shifting of the spool is determined by one or more algorithms or flow maps (e.g., a look-up table) that calculates an optimal position of the spool relative to the bore given the desired pressure at the work port and/or the flow limit. In some examples one or more algorithms or flow maps are configured to optimize leakage as between the supply line/supply port and the work port, and as between the work port and the tank/tank line/tank port, so as to minimize or reduce drift of an actuator of the system, e.g., a cylinder.

Yet another aspect of the present disclosure relates to a three-way spool valve comprising: a valve body defining a valve bore that extends along an axis, the valve body also including a supply port, a work port and a tank port all in fluid communication with the valve bore; a spool positioned within the bore, the spool including a first land axially separated from a second land by a flow passage, the spool being axially moveable along the axis when the spool valve is in a neutral state, wherein the spool is adapted to be axially shifted by a driver, when the spool valve is in the neutral state, in response to a command from a pressure controller that receives one or more pressure inputs and provides one or more flow outputs based at least in part on the one or more pressure inputs.

In some examples of the foregoing three-way spool valves, at least one of the one or more flow outputs causes the spool, when the spool valve is in the neutral state, to axially shift such that the first land at least partially unblocks the supply port and opens the supply port to the flow passage.

In some examples of the foregoing three-way spool valves, at least one of the one or more flow outputs causes the spool, when the spool valve is in the neutral state, to axially shift such that the second land at least partially unblocks the tank port and opens the tank port to the flow passage.

In some examples of the foregoing three-way spool valves, at least one of the one or more flow outputs causes the spool, when the spool valve is in the neutral state, to axially shift such that the first land moves towards the tank port and a deadband distance associated with the second land decreases but the tank port remains blocked to the flow passage by the second land.

In some examples of the foregoing three-way spool valves, at least one of the one or more flow outputs causes the spool, when the spool valve is in the neutral state, to axially shift such that the second land moves towards the supply port and a deadband distance associated with the first land decreases but the supply port remains blocked to the flow passage by the first land.

In some examples of the foregoing three-way spool valves, the axial shifting of the spool when the spool valve is in the neutral state is determined by one or more algorithms or flow maps (e.g., a look-up table) that calculates an optimal position of the spool relative to the bore given the desired pressure at the work port and/or a flow limit.

In some examples of the foregoing three-way spool valves, one or more algorithms or flow maps are configured to optimize leakage as between the supply line and the work port, and as between the work port and the tank/tank line, so as to minimize or reduce drift of an actuator of the system, e.g., a cylinder.

With respect to any of the foregoing systems, methods, and three-way spool valves, the pressure controller can include, and/or work in conjunction with, a computer processor that executes instructions stored on a non-transitory computer-readable medium. The instructions can include, e.g., the algorithm(s) and/or flow map(s) for modulating the fluid flow by shifting the spool.

The hydraulic systems, methods, and spool valves of the present disclosure can be applied in many situations and hydraulic apparatuses. Non-limiting examples of apparatuses that can incorporate systems and methods in accordance with the present disclosure include, e.g., asphalt sprayers, backhoe loaders, wheel loaders, tractors, telehandlers, aerial work platforms, etc.

DETAILED DESCRIPTION

Figure 1:
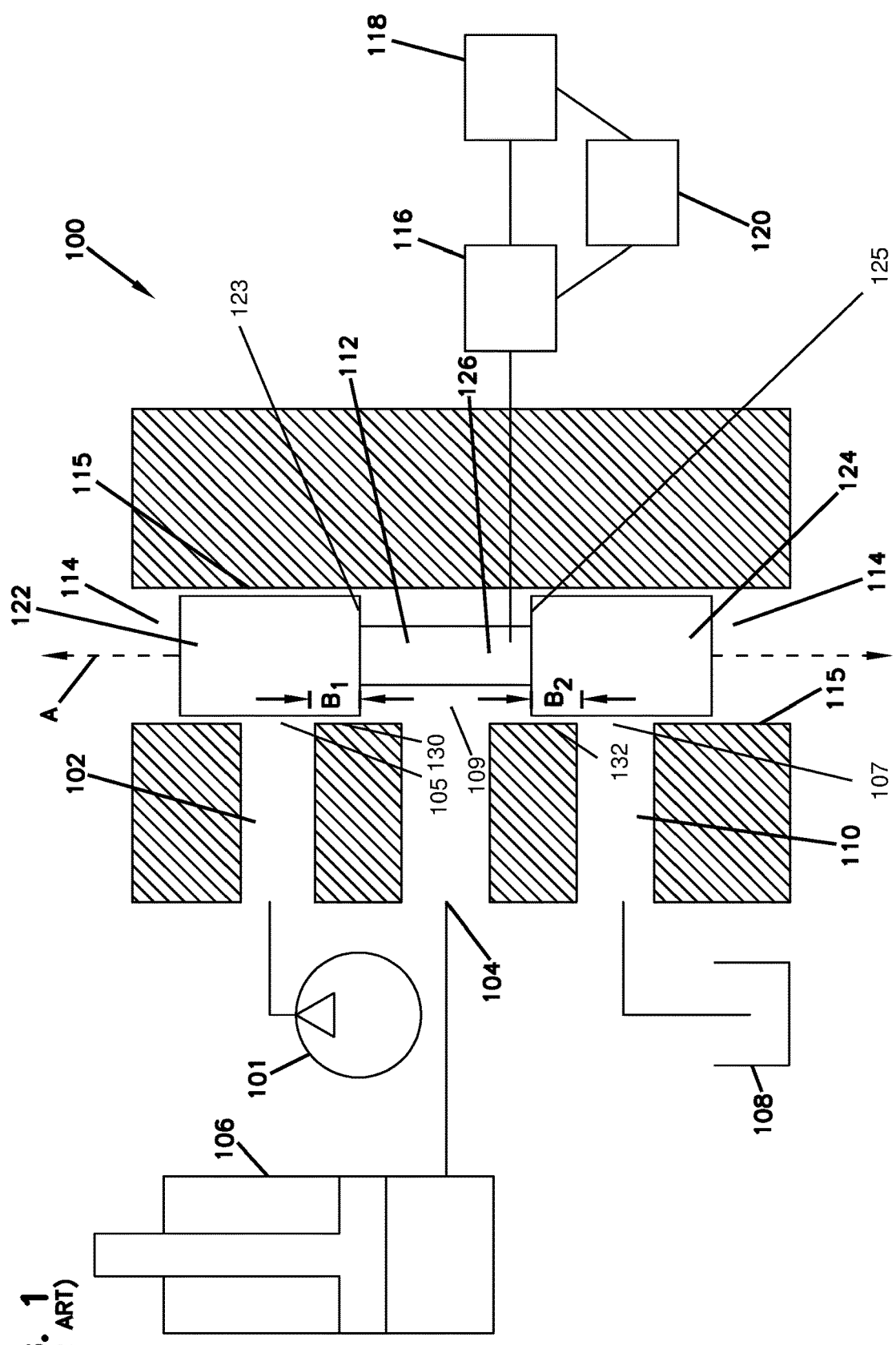
FIG. 1 is a schematic illustration of a prior art hydraulic system including a three-way spool valve, the hydraulic system being in a neutral state.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIG. 1, a prior art hydraulic system 100 in a neutral state includes a fluid supply 101 (e.g., a pump) that supplies hydraulic fluid via a supply line 102 through a supply port 105 to a work port 104. The work port 104 is connected to an actuator 106, (e.g., a cylinder), that drives a load. Fluid from the work port empties to the tank 108 via a tank port 107 and tank line 110.

A three-way spool valve includes a spool 112 disposed in a spool bore 114 that defines an axis A.

One or more drivers 116 axially drive(s) the spool 112 to move axially (i.e., in either direction along the axis A) within the spool bore 114. The one or more drivers can be, e.g., one or more solenoids and can be connected to a power source 118 and/or one or more controllers 120 for controlling when the driver(s) 116 are actuated and/or how much to actuate the driver(s) 116.

The spool 112 includes a first or supply side land 122 and a second or tank side land 124. The first and second lands are connected by a shaft 126. The lands and shaft form a rigid structure and move axially within the bore in unison. An axial flow passage 109 is defined between the lands 122 and 124 and, more specifically, between the edge 123 of the supply side land 122 and edge 125 of the tank side land 124.

The spool 112 regulates fluid flow from the supply line/supply port to the work port, and from the work port to the tank line/tank port. In FIG. 1, the hydraulic system 100 is in a neutral state, the supply side land 122 is blocking the supply port 105, and the tank side land 124 is blocking the tank port 107. That is, the edge 123 of the supply side land 122 coincides (transversely to the axis) with a region 130 of the spool bore 114 between the supply port 105 and the work port 104; and the edge 125 of the tank side land 124 coincides (transversely to the axis) with a region 132 of the spool bore 114 between the tank port 107 and the work port 104.

As mentioned, the hydraulic system 100 is in a neutral state. In this neutral state, the spool 112 is in a neutral (and centered) position within the spool bore 114 and with respect to the supply line 102 and the tank line 110. In the centered position of the spool 112 as shown, the deadband distance B1 of the supply side land 122 is equal to, or at least approximately equal to, the deadband distance B2 of the tank side land 124. Thus, in this example, the supply side and tank side lands are the same or approximately the same size, at least along the axial dimension.

Fluid leakage $Q_{leak, supply}$ in units of volume per time from the supply 101 past the deadband distance B1 of the supply side land 122 into the flow passage 109 when the supply side land 122 is blocking the supply port 105 can be governed by the following equation (1), in which D is the diameter (perpendicular to the axis A) of the supply side land 122, c is the clearance between the supply side land 122 and the wall 115 of the bore 114, $P_s$ is the fluid pressure in the supply line 102, $P_{port}$ is the fluid pressure at the work port (which is partially a function of the load), $x_{supply}$ is the leakage distance (measured along an axial direction) past the supply side land 122, which also corresponds to the deadband distance B1, and μ is the viscosity of the hydraulic fluid:

$$Q_{leak, supply} = \frac{D\pi c^3 (P_s - P_{port})}{\mu x_{supply}} \quad (1)$$

Fluid leakage $Q_{leak, tank}$ in units of volume per second from the work port 104 past the deadband distance B2 of the tank side land 124 into the flow passage 109 when the tank side land 124 is blocking the tank port 107 can be governed by the following equation (2), in which D is the diameter (perpendicular to the axis A) of the tank side land 124, c is the clearance between the tank side land 124 and the wall 115 of the bore 114, $P_{tank}$ is the fluid pressure in the tank line 110, $P_{port}$ is the fluid pressure at the work port (which is partially a function of the load), $x_{tank}$ is the leakage distance (measured along an axial direction) past the tank side land 124, which also corresponds to the deadband distance B2, and μ is the viscosity of the hydraulic fluid:

$$Q_{leak, tank} = \frac{D\pi c^3 (P_{port} - P_{tank})}{\mu x_{tank}} \quad (2)$$

In both equations (1) and (2), leakage is inversely proportional to leakage distance.

In the hydraulic system 100, which is in a neutral state, the spool 112 is automatically positioned/returned to the neutral (and centered) position shown and described above, regardless of any differential ΔP1 between $P_s$ and $P_{port}$ and regardless of any differential ΔP2 between $P_{port}$ and $P_{tank}$. Thus, due to the leakage distances provided by the depicted configuration, the hydraulic system 100 can suffer from unwanted leakage, for example, from the supply 101 to the work port 104 in the event of a positive ΔP1 that induces flow from the supply 101 to the work port 104, as well as leakage from the work port 104 to the tank line 110 in the event of a positive ΔP2 that induces flow from the work port 104 to the tank line 110.

Figure 2:
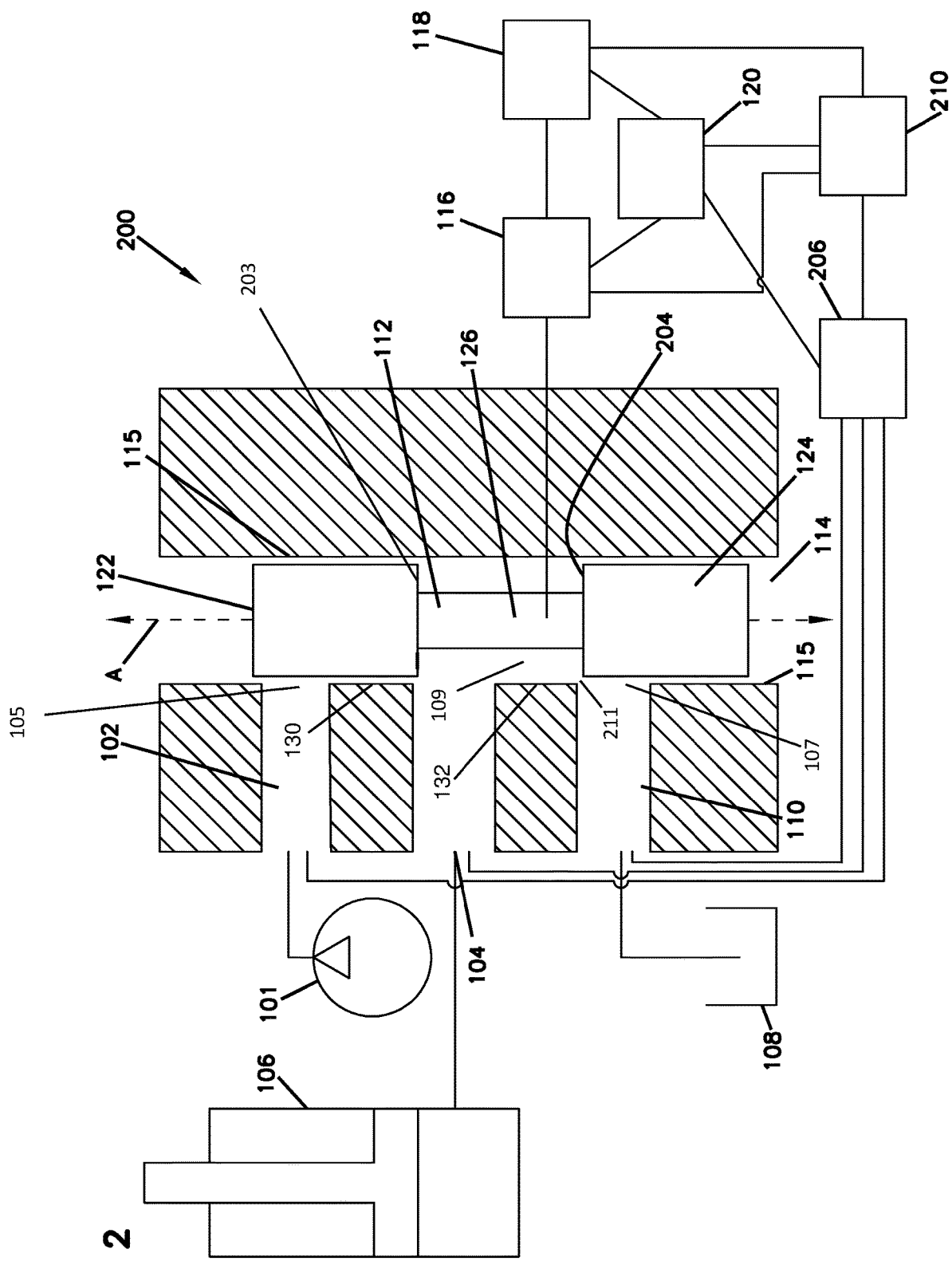
FIG. 2 is a schematic illustration of an example hydraulic system including a three-way spool valve in accordance with the present disclosure, the hydraulic system being in a neutral state and the spool valve being in a position in which the tank line/tank port is partially open to the work port.

Referring now to FIG. 2, a hydraulic system 200 in accordance with the present disclosure and configured to reduce unwanted leakage past the spool valve is schematically illustrated in a neutral state. Many of the features of the system 200 are equivalent to features of the system 100, and are indicated with like reference numbers.

The system 200 is designed to actively control pressure within the system 200 to reduce undesirable drifting of the cylinder 106 when the system 200 is in the neutral state.

One or more pressure sensors 206 actively measure the pressure at one or more locations within the system 200, such as the supply line 102/the supply port 105, the work port 104, and tank line 110/tank port 107. The measured pressure(s) are fed as inputs to the pressure controller 210. The pressure controller 210 can include and/or work in conjunction with, a computer processor that executes instructions stored on a non-transitory computer-readable medium.

The pressure controller 210 thus receives pressure inputs and also outputs flow commands to the system 200 as part of a feedback loop described in more detail below in connection with FIG. 3. The pressure inputs can also include one or more pre-determined pressure demands for one or more locations within the system 200.

In some examples, a given flow command is at least partially based on the input(s) received by the controller 210 and a predefined pressure demand. For example, based on pressure readings at the supply line 102/supply port 105, the work port 104, and/or the tank line 110/tank port 107 as compared with one or more predefined pressure demand input(s), the pressure controller 210 can output a command to the one or more drivers 116 (or to a controller 120 that controls the one or more drivers 116) to axially shift the spool 112 in order to achieve or at least approach the predefined pressure demand, e.g., at the work port 104 or the supply port 105, taking into account one or more other constraints imposed by the controller 210, such as a predefined flow limit.

In the example shown in FIG. 2, the pressure controller 210 has provided a command to shift the spool 112 such that the tank line 110/tank port 107 is partially opened to the flow passage 109, allowing direct flow between the work port 104 and the tank port 107 that is at least partially determined by the size of the opening 211. Thus, excess pressure in the work port 104, which might otherwise cause drifting of the cylinder 106, is relieved or partially relieved by allowing limited flow into the tank 108 via the controlled opening 211.

It should be appreciated that the position of the spool 112 in FIG. 2 is just one example of a spool shifting from the neutral position shown in FIG. 1 that can be demanded by the pressure controller 210 while the system 200 is in the neutral state.

In further non-limiting examples, the pressure controller 210, in response to at least one or more received pressure inputs, causes the one or more drivers 116 to actuate axial movement of the spool 112 such that the opening between the tank port 107 and the flow passage 109 is larger or smaller than the opening 211.

In further non-limiting examples, the pressure controller 210, in response to at least one or more received pressure inputs, causes the one or more drivers 116 to actuate axial movement of the spool 112 such that the supply side land 122 shifts towards the tank port 107 without unblocking the tank port 107 by the tank side land 124. Thus, in these examples, the shifting of the spool 112 (compared to the position in FIG. 1) increases the deadband distance of the supply side land 122 and decreases the deadband distance of the tank side land 124, while maintaining transverse coincidence of the edge 204 (corresponding to the edge 125 in FIG. 1) of the tank side land 124 with the axial region 132 of the spool bore 114 between the tank port 107 and the work port 104. The precise magnitude of axial shifting of the spool can be determined, at least in part, by a predefined pressure demand at, e.g., the work port 104.

In further non-limiting examples, the pressure controller 210, in response to at least one or more received pressure inputs, causes the one or more drivers 116 to actuate axial movement of the spool 112 such that an opening of an appropriate size is formed between the supply port 105 and the flow passage 109.

In still further non-limiting examples, the pressure controller 210, in response to at least one or more received pressure inputs, causes the one or more drivers 116 to actuate axial movement of the spool 112 such that the tank side land 124 shifts towards the supply port 105 without unblocking the supply port 105 by the supply side land 122. Thus, in these examples, the shifting of the spool 112 to a shifted neutral position (compared to the neutral position in FIG. 1) increases the deadband distance of the tank side land 124 and decreases the deadband distance of the supply side land 122, while maintaining transverse coincidence of the edge 203 (corresponding to the edge 123 in FIG. 1) of the supply side land 122 with the axial region 130 of the spool bore 114 between the supply port 105 and the work port 104. The precise magnitude of axial shifting of the spool can be determined, at least in part, by a pressure demand at, e.g., the supply port 105.

The pressure controller 210 can be adapted to actively (e.g., continuously, or repeatedly) monitor pressures in the system 200 and thereby actively provide commands to the spool valve driver(s), even as characteristics of the system may change while it remains in neutral, e.g., if a load on the cylinder 106 increases or decreases while the system 200 remains in neutral.

The commands provided by the pressure controller 210 may be calibrated according to one or more algorithms or flow maps that can be, e.g., pre-programmed into the system 200. For example, based on the leakage equations provided above, and in situations in which the supply line pressure is measured to be lower than the work port pressure, an optimal axial shifting ($x_{offset,\ optimal}$) of the spool 112 to a shifted neutral position relative to its neutral position (FIG. 1) that optimizes the total leakage of the system 200 in the neutral state to minimize undesirable drift of the cylinder 106 can be calculated with the following equation (3):

$$x_{offset,optimal} = \frac{\sqrt{P_{port} - P_{tank}}\, x_{supply} - \sqrt{P_{port} - P_{supply}}\, x_{tank}}{\sqrt{P_{port} - P_{supply}} + \sqrt{P_{port} - P_{tank}}} \quad (3)$$

It should be appreciated that the calculation of $x_{offset,\ optimal}$ using the above equation (3) can be performed actively as pressure readings at the supply, the work port, and the tank are actively updated (i.e., through a continuous feedback loop) and fed to the controller 210, thereby providing for a dynamic system that responds quickly to pressure changes in the neutral state and compensates for those pressure changes by making adjustments to the spool position according to active calculations of $x_{offset,\ optimal}$.

Figure 3:
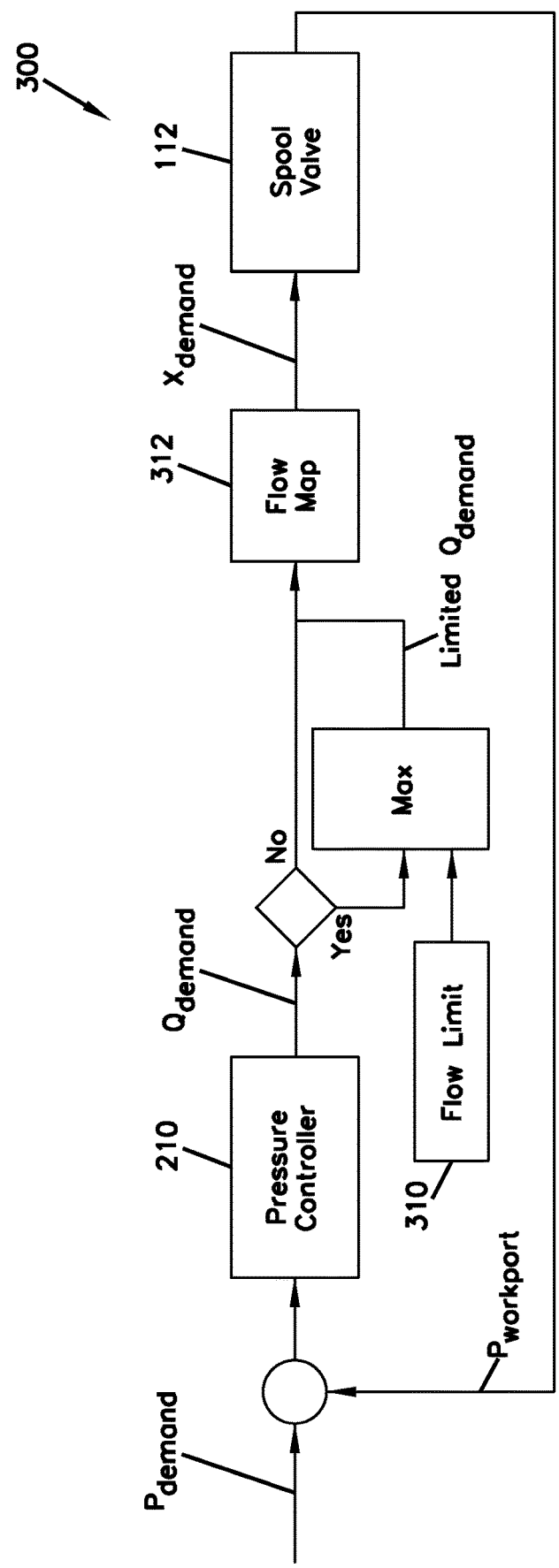
FIG. 3 is a schematic illustration of an example feedback loop flow control in accordance with the systems and methods of the present disclosure.

Referring now to FIG. 3, a schematic illustration of an example flow control 300 in accordance with the systems and methods of the present disclosure is shown.

In the flow control 300, the pressure controller 210 receives an actual pressure measurement input from the work port, $P_{workport}$, and a predefined pressure demand (i.e., predefined target) $P_{demand}$ for the work port. The predefined pressure $P_{demand}$ can be calculated, at least partially, to minimize drift of the cylinder 106 (FIG. 1) under at least certain conditions.

The work port pressure is monitored to make sure the actual sensed pressure ($P_{workport}$) is equal to $P_{demand}$, or within a given predefined deviation from $P_{demand}$.

If there is no discrepancy between $P_{workport}$ and $P_{demand}$ or the magnitude of the discrepancy is less than a predefined deviation, then no corrective action is taken by the pressure controller 210, i.e., the axial position of the spool is not changed.

If there is a discrepancy between $P_{workport}$ and $P_{demand}$ or the discrepancy meets or exceeds the predefined deviation (e.g., because of leakage across the valve from the supply port to the work port), the pressure controller 210 issues a flow command $Q_{demand}$. $Q_{demand}$ can be calculated by the pressure controller, accessed from a look-up table, etc. $Q_{demand}$ sets a flow from the work port to the tank port which would effectively correct the detected over-pressurization of the work port and equalize $P_{workport}$ with $P_{demand}$ or at least bring them to within the predefined deviation.

In some examples, the value of the determined $Q_{demand}$ is checked against a pre-determined flow limit 310 (a maximum value that ensures effective control is maintained by the system). If the determined $Q_{demand}$ is greater than the flow limit, then the final $Q_{demand}$ is set to the flow limit. If the determined $Q_{demand}$ is lower than the flow limit, then the determined $Q_{demand}$ is used as the final $Q_{demand}$.

Based on the value of the final $Q_{demand}$, the desired spool position required to achieve the final $Q_{demand}$ (e.g., by accessing data from a flow map 312) is determined, and a spool shifting command $x_{demand}$ is sent to the spool 112, e.g., via the one or more drivers 116 and/or the one or more controllers 120 (FIG. 2), which axially shifts the spool 112 according to the spool shifting command to the calculated spool position. In the case where the valve is a proportional valve and the spool driver is a proportional solenoid, a current value suitable for moving the spool to the desired spool position (e.g., as determined by the flow map or other means) is applied to the proportional solenoid. In the case of a voice coil, the voice coil controls a pilot spool, which provides the needed flow/pressure to move the main stage spool 112, the current to the voice coil being proportional to the flow provided to move the main stage spool 112.

Once the spool position has been adjusted by the spool driver, the system loops back and the newly sensed $P_{workport}$ is compared against $P_{demand}$. The cycle is preferably repeated in an endless feedback loop to ensure minimal deviation of $P_{workport}$ from $P_{demand}$.

In other flow control examples, a similar feedback loop can be used to make corrections for sensed drops in $P_{workport}$ caused by leakage from the work port to the tank port. In this alternative feedback loop, $Q_{demand}$ would correspond to a flow from the supply port to the work port determined to raise the $P_{workport}$ back to $P_{demand}$.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A hydraulic system having an operational state and a neutral state and comprising:
   a fluid supply line having a supply port and in fluid communication with a work port, the work port being in fluid communication with a tank line having a tank port and being connected to a tank;
   a spool valve having a spool at least partially disposed in a spool bore defining an axis, the spool being axially moveable within the bore and being adapted to regulate fluid flow from the supply line to the work port and from the work port to the tank;

a driver; and a pressure controller adapted to receive one or more pressure inputs including at least a sensed pressure at either the supply port or the tank port that is blocked by the spool and provide one or more flow outputs based at least in part on the one or more pressure inputs, the one or more flow outputs causing the driver to axially shift the spool from a neutral position within the bore to an axially shifted neutral position within the bore when the system is in the neutral state.

2. The hydraulic system as in claim 1, wherein the one or more pressure inputs include at least one sensed pressure at a location in the system, and at least one pre-determined pressure demand for the location.

3. The hydraulic system as in claim 1, wherein the one or more flow outputs cause the driver to axially shift the spool to an axially shifted neutral position such that the supply port is at least partially opened to a flow passage defined by the spool to provide direct fluid communication between the supply port and the work port.

4. The hydraulic system as in claim 1, wherein the one or more flow outputs cause the driver to axially shift the spool to an axially shifted neutral position such that the tank port is at least partially opened to a flow passage defined by the spool to provide direct fluid communication between the work port and the tank port.

5. The hydraulic system as in claim 1, wherein the one or more flow outputs cause the driver to axially shift the spool to increase an axial deadband distance of the spool associated with the supply port or to increase an axial deadband distance of the spool associated with the tank port, without opening either of the supply port or the tank port to a flow passage defined by the spool.

6. The hydraulic system of claim 1, further comprising one or more pressure sensors that detect one or more fluid pressures within the system and provide measurements of the one or more fluid pressures to the pressure controller as one or more of the one or more pressure inputs.

7. The hydraulic system of claim 1, wherein the pressure controller is configured to command the driver to axially shift the spool within the bore when the system is in the neutral state before a pressure at the work port reaches a level high enough or low enough to cause drifting of a cylinder connected to the work port.

8. The hydraulic system of claim 1, wherein a pre-determined flow limit limits a distance that the spool shifts axially in response to the one or more flow outputs.

9. The hydraulic system of claim 1, wherein the axial shifting of the spool is determined by a flow map that calculates an optimal position of the spool relative to the bore based at least in part on one of the one or more pressure inputs.

10. The hydraulic system of claim 1, wherein the driver comprises a solenoid, or wherein the spool is a main stage spool and the driver comprises a voice coil and a pilot spool.

11. The hydraulic system as in claim 10, wherein the solenoid is a proportional solenoid adapted to apply force to the spool in proportion to a current supplied to the proportional solenoid.

12. The hydraulic system of claim 1, wherein the spool comprises first and second lands, each of the lands having an associated deadband distance with an associated port, and wherein the axial shifting causes one of the deadband distances to increase and the other deadband distance to decrease.

13. A three-way spool valve comprising:

a valve body defining a valve bore that extends along an axis, the valve body also including a supply port, a work port and a tank port all in fluid communication with the valve bore;

a spool positioned within the bore, the spool including a first land axially separated from a second land by a flow passage, the spool being axially moveable along the axis when the spool valve is in a neutral state, wherein the spool is adapted to be axially shifted by a driver, when the spool valve is in the neutral state, in response to a command from a pressure controller that receives one or more pressure inputs including at least a sensed pressure at either the supply port or the tank port that is blocked by the spool and provides one or more flow outputs based at least in part on the one or more pressure inputs.

14. The three-way spool valve as in claim 13, wherein the one or more pressure inputs include at least one sensed pressure at a location in the valve, and at least one pre-determined pressure demand for the location.

15. The three-way spool valve of claim 13, wherein at least one of the one or more flow outputs causes the spool, when the spool valve is in the neutral state, to shift such that the first land at least partially opens the supply port to the flow passage.

16. The three-way spool valve of claim 13, wherein at least one of the one or more flow outputs causes the spool, when the spool valve is in the neutral state, to shift such that the second land at least partially opens the tank port to the flow passage.

17. The three-way spool valve of claim 13, wherein at least one of the one or more flow outputs causes the spool, when the spool valve is in the neutral state, to shift such that the first land moves towards the tank port and a deadband distance associated with the second land decreases but the tank port remains blocked to the flow passage by the second land.

18. The three-way spool valve of claim 13, wherein at least one of the one or more flow outputs causes the spool, when the spool valve is in the neutral state, to shift such that the second land moves towards the supply port and a deadband distance associated with the first land decreases but the supply port remains blocked to the flow passage by the first land.

19. The three-way spool valve of claim 14, wherein the spool is axially shifted when the spool valve is in the neutral state according to, at least in part, a flow map that calculates an optimal position of the spool based at least in part on the pre-determined pressure demand.

20. The three-way spool valve of claim 13, wherein a pre-determined flow limit limits a distance that the spool shifts axially in response to the one or more flow outputs.

21. The three-way spool valve of claim 13, wherein the driver comprises a solenoid, or wherein the spool is a main stage spool and the driver comprises a voice coil and a pilot spool.

22. The three-way spool valve as in claim 21, wherein the solenoid is a proportional solenoid adapted to apply force to the spool in proportion to a current supplied to the proportional solenoid.

\* \* \* \* \*